US012602754B2

(12) United States Patent
Wang et al.

(10) Patent No.: US 12,602,754 B2
(45) Date of Patent: Apr. 14, 2026

(54) DYNAMIC IMAGING AND MOTION ARTIFACT REDUCTION THROUGH DEEP LEARNING

(71) Applicant: Rensselaer Polytechnic Institute, Troy, NY (US)

(72) Inventors: Ge Wang, Loudonville, NY (US); Qing Lyu, Troy, NY (US); Hongming Shan, Troy, NY (US)

(73) Assignee: Rensselaer Polytechnic Institute, Troy, NY (US)

( * ) Notice: Subject to any disclaimer, the term of this patent is extended or adjusted under 35 U.S.C. 154(b) by 389 days.

(21) Appl. No.: 17/686,819

(22) Filed: Mar. 4, 2022

(65) Prior Publication Data

US 2022/0292641 A1    Sep. 15, 2022

Related U.S. Application Data

(60) Provisional application No. 63/156,436, filed on Mar. 4, 2021, provisional application No. 63/212,822, filed on Jun. 21, 2021.

(51) Int. Cl.
*G06T 5/73* (2024.01)
*G06N 3/044* (2023.01)
(Continued)

(52) U.S. Cl.
CPC .............. *G06T 5/73* (2024.01); *G06N 3/044* (2023.01); *G06N 3/045* (2023.01); *G06T 3/4046* (2013.01);
(Continued)

(58) Field of Classification Search
CPC ...... G06N 3/044; G06N 3/045; G06N 3/0455; G06N 3/0464; G06N 3/09; G06N 3/094;
(Continued)

(56) References Cited

U.S. PATENT DOCUMENTS

| 5,051,904 A | 9/1991 | Griffith |
| 5,245,191 A | 9/1993 | Barber et al. |

(Continued)

FOREIGN PATENT DOCUMENTS

| WO | 2019145027 A1 | 8/2019 |
| WO | 2020041503 A1 | 2/2020 |

OTHER PUBLICATIONS

Yang et al, "Low-Dose CT Image Denoising Using a Generative Adversarial Network With Wasserstein Distance and Perceptual Loss", 2018 (Year: 2018).*

(Continued)

*Primary Examiner* — Ruiping Li
(74) *Attorney, Agent, or Firm* — Barclay Damon LLP; Anthony P. Gangemi

(57) ABSTRACT

A deep neural network for motion artifact reduction includes a transformer neural network, and a synthesis neural network. The transformer neural network is configured to receive input image data comprising a target image, a prior image, and a subsequent image. The transformer neural network is configured to mitigate a temporal aspect of the motion artifact, and to provide a transformer output related to the input data. The synthesis neural network is configured to receive the transformer output, and to provide at least one output image having a reduced motion artifact relative to the input image data.

12 Claims, 6 Drawing Sheets

(51) Int. Cl.
  *G06N 3/045*        (2023.01)
  *G06T 3/4046*       (2024.01)
  *G06T 5/60*         (2024.01)

(52) U.S. Cl.
  CPC ...... *G06T 5/60* (2024.01); *G06T 2207/10081*
    (2013.01); *G06T 2207/10088* (2013.01); *G06T*
      *2207/20081* (2013.01); *G06T 2207/20084*
                                    (2013.01)

(58) Field of Classification Search
  CPC . G06T 2207/10016; G06T 2207/10081; G06T
      2207/10088; G06T 2207/20081; G06T
      2207/20084; G06T 2207/20201; G06T
      2207/30048; G06T 3/4046; G06T 5/00;
                      G06T 5/60; G06T 5/73
  See application file for complete search history.

(56)                  References Cited

U.S. PATENT DOCUMENTS

| | | | |
|---|---|---|---|
| 5,319,550 | A | 6/1994 | Griffith |
| 6,765,981 | B2 | 7/2004 | Heumann |
| 7,668,354 | B2 | 2/2010 | O'Donnell et al. |
| 7,863,574 | B2 | 1/2011 | Hahn et al. |
| 8,650,014 | B2 | 2/2014 | Vija et al. |
| 8,675,936 | B2 | 3/2014 | Vija et al. |
| 8,886,283 | B1 | 11/2014 | Chen et al. |
| 9,129,425 | B2 | 9/2015 | Myers et al. |
| 9,171,353 | B2 | 10/2015 | Vija et al. |
| 9,684,979 | B2 | 6/2017 | Lu et al. |
| 10,335,037 | B2 | 7/2019 | Jolly et al. |
| 10,582,863 | B2 | 3/2020 | Rosa |
| 2016/0282432 | A1 | 9/2016 | Wang |
| 2017/0003366 | A1 | 1/2017 | Jafari-Lhouzani |
| 2017/0131223 | A1 | 5/2017 | Hild et al. |
| 2018/0143275 | A1* | 5/2018 | Sofka .................... G06T 7/0012 |
| 2019/0035078 | A1 | 1/2019 | Zaharchuk et al. |
| 2019/0064296 | A1 | 2/2019 | Otazo et al. |
| 2019/0125206 | A1 | 5/2019 | Kristanto et al. |
| 2019/0279361 | A1 | 9/2019 | Meyer et al. |
| 2020/0118266 | A1 | 4/2020 | Avendi et al. |
| 2020/0138521 | A1 | 5/2020 | Aben et al. |
| 2020/0151922 | A1 | 5/2020 | Xu et al. |
| 2020/0357148 | A1* | 11/2020 | Soons ................... G06T 3/4076 |

OTHER PUBLICATIONS

Song et al, "Low-Dose Cardiac-Gated Spect Via a Spatiotemporal Convolutional Neural Network", 2020 (Year: 2020).*

Kofler et al, "Spatio-Temporal Deep Learning-Based Undersampling Artefact Reduction for 2D Radial Cine MRI With Limited Training Data", 2020 (Year: 2020).*

Wu et al, "Combined spatial and temporal deep learning for image noise reduction of fluoroscopic x-ray sequences", 2020 (Year: 2020).*

* cited by examiner

100

200

500

530

600

Receive input data
602

Train a deep neural network using synthetic
image data and a WGAN framework
604

Fine-tune deep neural network training
using actual image data
606

Receive input image data
608

Provide at least one output image having a reduced
motion artifact relative to the input image data
610

DYNAMIC IMAGING AND MOTION ARTIFACT REDUCTION THROUGH DEEP LEARNING

CROSS REFERENCE TO RELATED APPLICATION(S)

This application claims the benefit of U.S. Provisional Application No. 63/156,436, filed Mar. 4, 2021, which is incorporated by reference as if disclosed herein in its entirety.

GOVERNMENT LICENSE RIGHTS

This application claims the benefit of U.S. Provisional Application No. 63/156,436, filed Mar. 4, 2021, and U.S. Provisional Application No. 63/212,822, filed Jun. 21, 2021, which are incorporated by reference as if disclosed herein in their entireties.

FIELD

The present disclosure relates to deep learning, in particular to, dynamic imaging and motion artifact reduction through deep learning.

BACKGROUND

Cardiovascular diseases are currently a leading cause of death in the world. Computed tomography (CT) is an extensively used imaging modality for cardiovascular disease screening due to its non-invasive and high-resolution characteristics. To clearly show the shape of coronary arteries, sub-millimeter spatial resolution of cardio imaging is needed. However, it is difficult to obtain such a high-resolution cardiac CT image using conventional low-speed CT scanner because of heart motion during the scanning process. To eliminate heart motion artifacts and improve image quality, high-speed CT or electrocardiogram-gated (ECG-gated) cardiac CT scanners have been developed. Although these scanners can generate relatively good cardiac CT images, their prices are much higher than low-speed CT scanners, thus, limiting their use.

Magnetic resonance imaging (MRI) is a widely used medical imaging modality for disease diagnosis and pathological analysis. It can noninvasively present a patient's interior architecture with relatively good tissue contrast and without exposing the patient to ionizing radiation. MRI may be used for dynamic imaging of heart activity, thus aiding cardiac and cardiovascular disease diagnosis. For example, cardiac cine imaging may capture dynamic motion of the heart and the great vessels during a heart beating period. MRI cardiac cine imaging can provide accurate measurement of cardiac physiological characteristics including, for example, chamber volumes and myocardial mass, that may aid in diagnosing cardiac disease (e.g., myocardial infarction).

Accurate cardiovascular disease diagnosis may rely on high-quality dynamic cardiac cine MRI images that may be acquired in a relatively long scan time. Patient motion related to respiration, body movement, and heart beating during the scan process can induce motion artifacts and degrade image quality.

SUMMARY

In some embodiments, there is provided a deep neural network for motion artifact reduction. The deep neural network for motion artifact reduction includes a transformer neural network, and a synthesis neural network. The transformer neural network is configured to receive input image data including a target image, a prior image, and a subsequent image. The transformer neural network is configured to mitigate a temporal aspect of the motion artifact, and to provide a transformer output related to the input data. The synthesis neural network is configured to receive the transformer output, and to provide at least one output image having a reduced motion artifact relative to the input image data.

In some embodiments of the deep neural network, the transformer neural network includes a temporal stage and the synthesis neural network includes an encoder circuitry and a decoder circuitry.

In some embodiments of the deep neural network, the temporal stage includes a forward convolutional long short-term memory (ConvLSTM) network and a backward ConvLSTM network.

In some embodiments of the deep neural network, the synthesis neural network includes a multiscale stage configured to scale the target image.

In some embodiments of the deep neural network, the transformer neural network and the synthesis neural network are trained in a Wasserstein generative adversarial network (WGAN) framework.

In some embodiments of the deep neural network, the input image data is selected from the group including magnetic resonance imaging (MRI) image data and computed tomography (CT) image data.

In some embodiments of the deep neural network, the transformer neural network and the synthesis neural network are configured to extract both temporal features and spatial features.

In some embodiments of the deep neural network, the multiscale stage includes a plurality of convolutional neural networks.

In some embodiments of the deep neural network, the transformer neural network or the synthesis neural network is trained using synthetic data.

In some embodiments of the deep neural network, the training is fine-tuned using actual data.

In some embodiments, there is provided a deep learning system for motion artifact reduction. The deep learning system includes a computing device, a deep learning module, and a deep neural network. The computing device includes a processor, a memory, an input/output circuitry, and a data store. The deep learning module is configured to receive input data. The deep neural network includes a transformer neural network, and a synthesis neural network. The transformer neural network is configured to receive input image data including a target image, a prior image, and a subsequent image. The transformer neural network is configured to mitigate a temporal aspect of the motion artifact, and to provide a transformer output related to the input data. The synthesis neural network is configured to receive the transformer output, and to provide at least one output image having a reduced motion artifact relative to the input image data.

In some embodiments of the deep learning system, the transformer neural network includes a temporal stage and the synthesis neural network includes an encoder circuitry and a decoder circuitry.

In some embodiments of the deep learning system, the temporal stage includes a forward convolutional long short-term memory (ConvLSTM) network and a backward ConvLSTM network.

In some embodiments of the deep learning system, the synthesis neural network includes a multiscale stage configured to scale the target image.

In some embodiments of the deep learning system, the transformer neural network and the synthesis neural network are trained in a Wasserstein generative adversarial network (WGAN) framework.

In some embodiments of the deep learning system, the input image data is selected from the group including magnetic resonance imaging (MRI) image data and computed tomography (CT) image data.

In some embodiments of the deep learning system, the transformer neural network and the synthesis neural network are configured to extract both temporal features and spatial features.

In some embodiments of the deep learning system, the multiscale stage includes a plurality of convolutional neural networks.

In some embodiments of the deep learning system, the transformer neural network or the synthesis neural network is trained using synthetic data.

In some embodiments of the deep learning system, the training is fine-tuned using actual data.

BRIEF DESCRIPTION OF DRAWINGS

The drawings show embodiments of the disclosed subject matter for the purpose of illustrating features and advantages of the disclosed subject matter. However, it should be understood that the present application is not limited to the precise arrangements and instrumentalities shown in the drawings, wherein:

FIG. 2;

Although the following Detailed Description will proceed with reference being made to illustrative embodiments, many alternatives, modifications, and variations thereof will be apparent to those skilled in the art.

DETAILED DESCRIPTION

Generally, this disclosure relates to dynamic imaging and motion artifact reduction through deep learning. A method, apparatus and/or system may be configured to receive image data that includes a plurality of sequential images, e.g., dynamic magnetic resonance imaging (MRI) images, or cardiac computed tomography (CT). The plurality of sequential images included in the image data may include motion artifacts due to, for example, patient movement during a relatively long scan time and/or movement of a target organ, e.g., a beating heart. In one nonlimiting example, the input data may include cine cardiac MRI images. The method, apparatus and/or system may thus be configured to reduce motion artifacts and/or improve temporal resolution of the cine cardiac MRI images. Generally, the method, apparatus and/or system may be configured to improve image quality (i.e., reduce motion artifacts) considering both temporal and spatial aspects of the received image data. In an embodiment, a deep recurrent generative adversarial-based neural network model may be configured to generally simultaneously extract both spatial and temporal features from, for example, under-sampled, motion-blurred cine cardiac images for improved image quality.

In an embodiment, a deep learning system may include a transformer neural network (NN) configured to accommodate temporal aspects, and a synthesis NN configured to accommodate spatial aspects. The method, apparatus and/or system may then be configured to enhance both dynamic MRI images or cardiac CT images. In an MRI embodiment, an NN consistent with the present disclosure is configured to achieve dynamic MRI super-resolution.

In an embodiment, there is provided a deep neural network for motion artifact reduction. The deep neural network for motion artifact reduction includes a transformer neural network, and a synthesis neural network. The transformer neural network is configured to receive input image data including a target image, a prior image, and a subsequent image. The transformer neural network is configured to mitigate a temporal aspect of the motion artifact, and to provide a transformer output related to the input data. The synthesis neural network is configured to receive the transformer output, and to provide at least one output image having a reduced motion artifact relative to the input image data.

Figure 1:
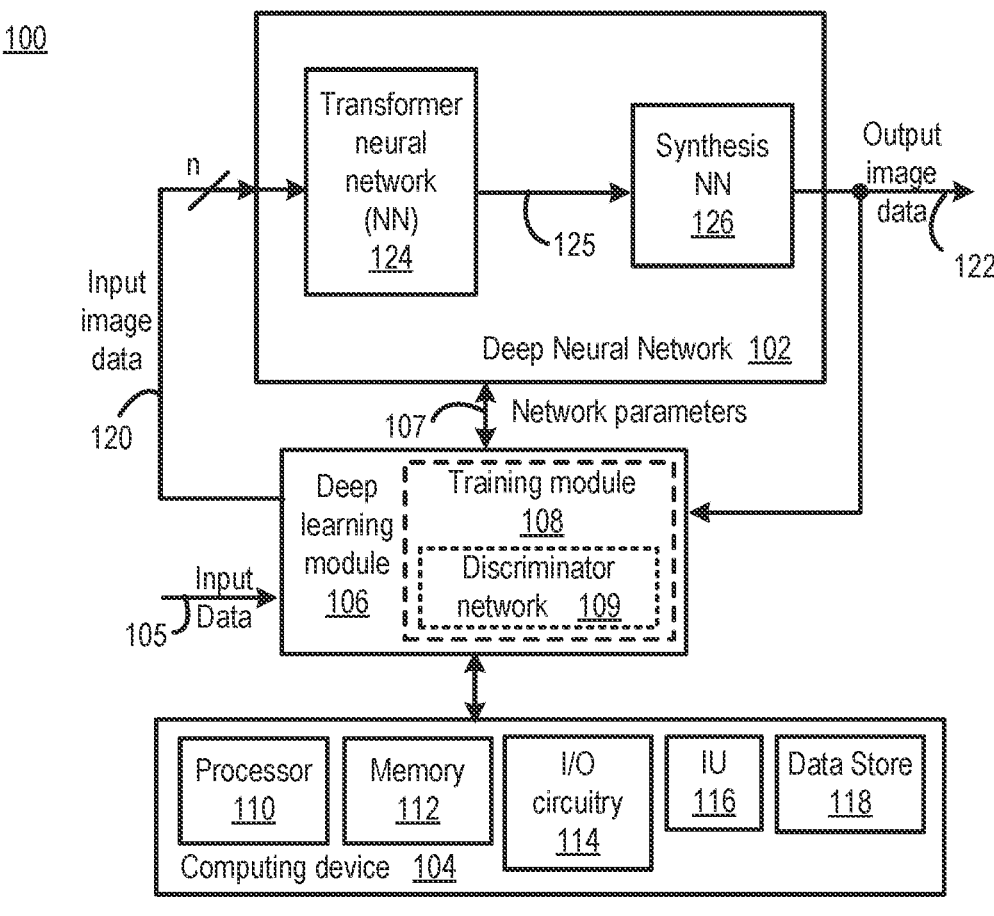
FIG. 1 illustrates a functional block diagram of a deep learning system for dynamic imaging and motion artifact reduction, according to several embodiments of the present disclosure.

FIG. 1 illustrates a functional block diagram of a deep learning system 100 for dynamic imaging and motion artifact reduction, according to several embodiments of the present disclosure. Deep learning system 100 includes a deep neural network 102, a computing device 104, and a deep learning module 106. In some embodiments, deep learning system 100, e.g., deep learning module 106, may include a training module 108. In some embodiments, training module 108 may include a discriminator (D) 109. Deep neural network 102 and/or deep learning module 106 may be coupled to or included in computing device 104. The deep neural network 102 is configured to receive image input data 120 and to provide output image data 122, as will be described in more detail below. The input image data may include motion artifacts and the output image data may include reduced motion artifacts.

Deep neural network 102 includes a transformer neural network (NN) 124, and a synthesis neural network 126. As used herein, "neural network" and "artificial neural network" are used interchangeably and are both abbreviated as "NN". Transformer NN 124 and/or synthesis NN 126 may include, but are not limited to, a deep ANN, a convolutional neural network (CNN), a deep CNN, a multilayer perceptron (MLP), etc. In an embodiment, transformer NN 124 and/or synthesis NN 126 may each correspond to a respective deep neural network. The transformer NN 124 is configured to receive input image data 120 that includes a number, n, generally sequential images. The transformer NN 124 is configured to produce a transformer output 125 that may then correspond to an input to synthesis NN 126. The synthesis NN 126 is configured to produce corresponding output image data 122. The output image data 122 may then be corrected for dynamic and/or motion artifacts, that may be present in the input image data 120.

Computing device 104 may include, but is not limited to, a computing system (e.g., a server, a workstation computer, a desktop computer, a laptop computer, a tablet computer, an ultraportable computer, an ultramobile computer, a netbook computer and/or a subnotebook computer, etc.), and/or a smart phone. Computing device 104 includes a processor 110, a memory 112, input/output (I/O) circuitry 114, a user interface (UI) 116, and data store 118.

Processor 110 is configured to perform operations of deep neural network 102 and/or deep learning module 106. Memory 112 may be configured to store data associated with deep neural network 102 and/or deep learning module 106. I/O circuitry 114 may be configured to provide wired and/or wireless communication functionality for deep learning system 100. For example, I/O circuitry 114 may be configured to receive input data 105 (e.g., input image data 120 and/or training data) and to provide output image data 122. UI 116 may include a user input device (e.g., keyboard, mouse, microphone, touch sensitive display, etc.) and/or a user output device, e.g., a display. Data store 118 may be configured to store one or more of input data 105, input image data 120, transformer output 125, output image data 122, network parameters associated with transformer NN 124 and/or synthesis NN 126, and data associated with deep learning module 106 and/or training module 108. Data associated with training module 108 may include, for example, training data, as described herein.

Deep neural network 102 (i.e., transformer NN 124 and/or synthesis NN 126) may be trained by deep learning module 106 and/or training module 108 based, at least in part, on training data. Training data may be included in input data 105 received by deep learning module 106. Input data may include, e.g., synthetic imaging data, a sequence of actual MRI imaging data, and/or a sequence of actual dynamic cardiac CT imaging data. The sequences of imaging data may be sequential in time and/or a relatively small number of images (e.g., fewer than 5 images) may correspond to a same location or near the same location in an imaging object (e.g., a patient). Initially, the imaging data may be used for training the NNs and, after training, the imaging data may include actual image data configured for motion artifact reduction, as described herein.

In operation, input data 105 may be received by deep learning module 106 and may then be stored in data store 118. Deep learning module 106, e.g., training module 108, may be configured to train deep neural network 102 using training data. Training operations may include, for example, providing training input image data to deep neural network 102, capturing estimated output image data from the deep neural network 102, comparing the estimated output image data to a corresponding training output image data, and adjusting one of more network parameters 107 based, at least in part, on a result of the comparison.

In one nonlimiting example, training image data may include a synthetic data set that may be used, initially, to train deep neural network 102. The initial training may then be fine-tuned using actual image data. In an embodiment, training module 108 may include discriminator network 109, and may thus be configured to utilize a Wasserstein generative adversarial network (WGAN) framework to train the deep neural network 102. In some embodiments, the WGAN framework may include gradient penalty. During the WGAN training, deep neural network 102 may correspond to the generative network. After training, the deep neural network 102 may then be used to reduce motion artifacts and/or enhance resolution of actual input image data.

Figure 2:
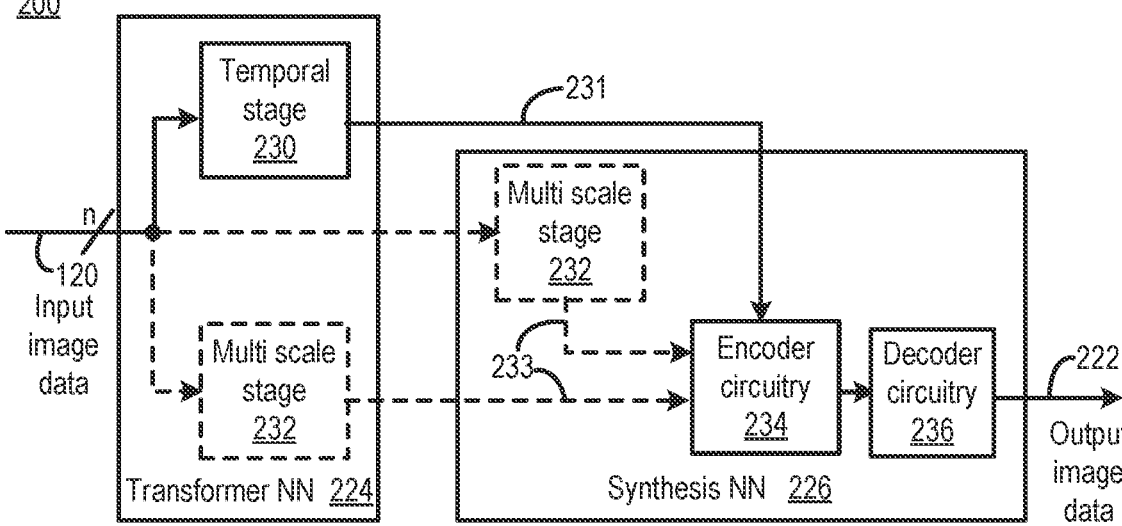
FIG. 2 illustrates a functional block diagram of an example deep neural network architecture, according to an embodiment of the present disclosure.

FIG. 2 illustrates a functional block diagram of an example deep neural network 200 architecture, according to an embodiment of the present disclosure. Deep neural network 200 is one example of deep neural network 102 of FIG. 1. Deep neural network 200 includes a transformer NN 224 and a synthesis NN 226. Transformer NN 224 is configured to receive input image data 120 and to provide transformed data to synthesis NN 226. For example, the transformed data may include temporal stage output data 231. Synthesis NN 226 is configured to receive the transformed data and to produce output image data 222.

Transformer NN 224 includes a temporal stage 230. In some embodiments, transformer NN 224 may include a multiscale stage 232. In some embodiments, the multiscale stage 232 may be included in the synthesis NN 226. Synthesis NN 226 includes encoder circuitry 234 and decoder circuitry 236. Temporal stage 230 and multiscale stage 232 are each configured to receive at least a portion of input image data 120, and to provide respective outputs, i.e., temporal stage output 231, and multiscale stage output 233, to synthesis NN (e.g., encoder circuitry 234). In one non-limiting example, temporal stage 230 may correspond to a recurrent generative adversarial-based network model with bidirectional ConvLSTM (convolutional long short-term memory) branches, and multiscale stage 232 may include at least one multiscale structure. Transformer NN 224 may thus be configured to extract spatiotemporal features from input image data. Synthesis NN 226 may be configured to receive outputs from transformer NN 224, e.g., the extracted spatiotemporal features, and may be further configured to reconstruct motion reduced images.

Figure 3A:
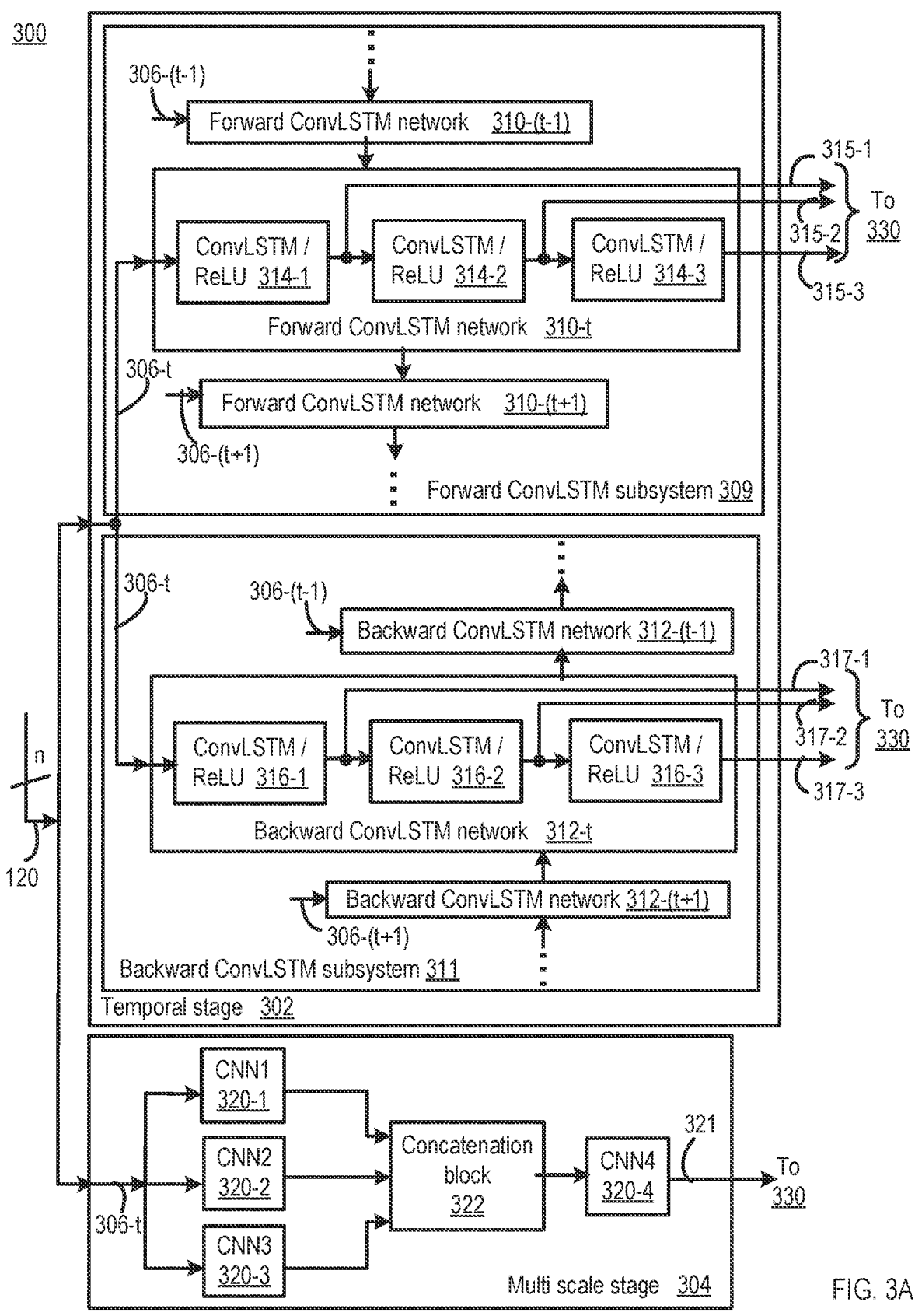
FIG. 3A illustrates a functional block diagram of an example transformer neural network (NN) architecture corresponding to the transformer NN of FIG. 2.
Figures 3B, 3C:
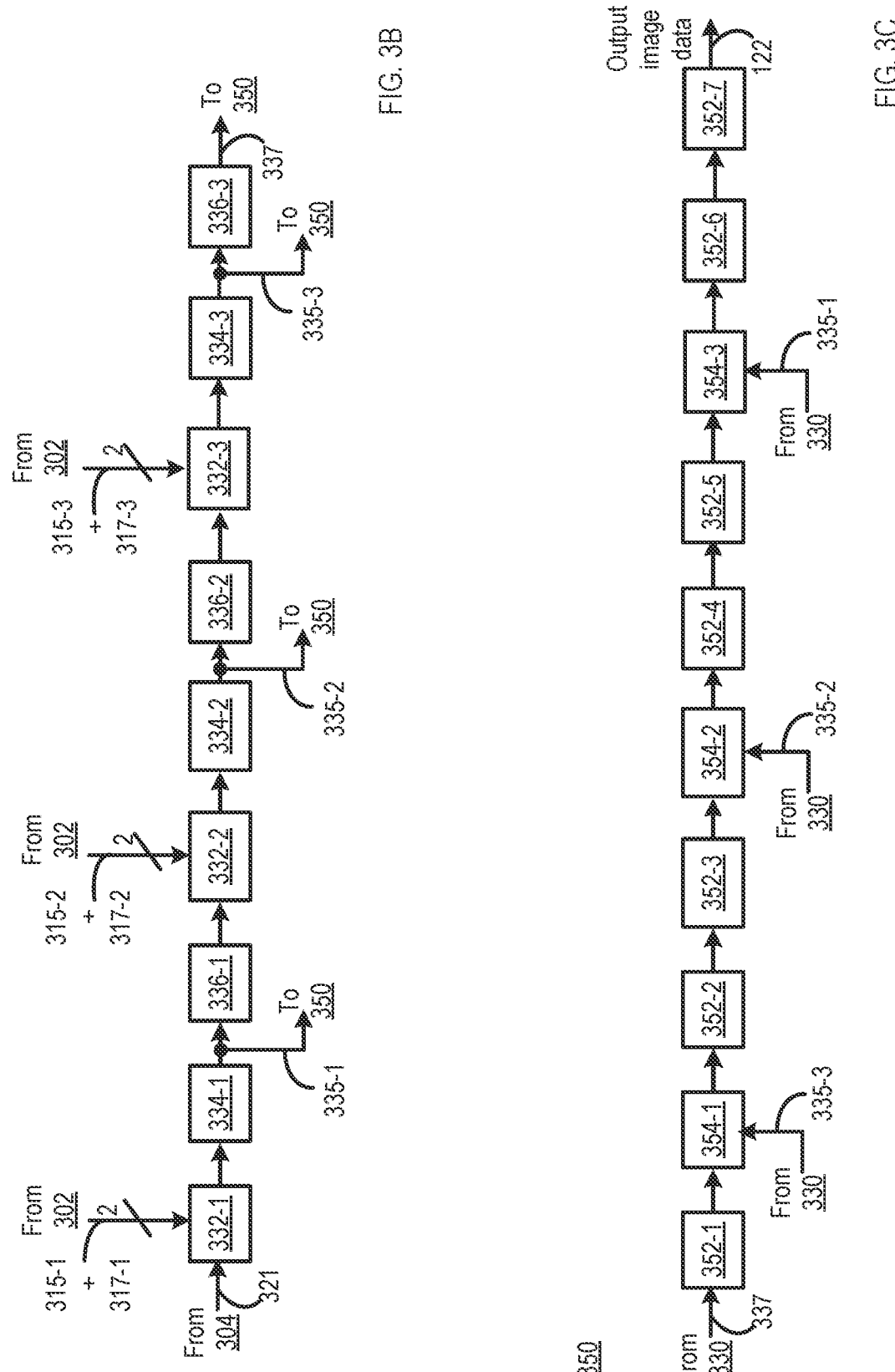
FIG. 3B illustrates a functional block diagram of an example encoder circuitry corresponding to the encoder circuitry of FIG. 2.
FIG. 3C illustrates a functional block diagram of an example decoder circuitry corresponding to the decoder circuitry of FIG.

FIG. 3A illustrates a functional block diagram of an example transformer NN 300 architecture corresponding to the transformer NN 224 of FIG. 2. FIG. 3B illustrates a functional block diagram of an example encoder circuitry 330 corresponding to the encoder circuitry 234 of FIG. 2. FIG. 3C illustrates a functional block diagram of an example decoder circuitry 350 corresponding to the decoder circuitry 236 of FIG. 2. FIGS. 3A through 3C may be best understood when considered together.

Transformer NN 300 includes a temporal stage 302. In some embodiments, transformer NN 300 may further include a multiscale stage 304. In some embodiments, the multiscale stage 304 may be included in encoder circuitry 330. Transformer NN 300 is configured to receive input image data 120 and to provide a number of outputs to encoder circuitry 330. Input image data 120 may include a number, n, of sequential images (i.e., image data). In one example, the input images 120 may correspond to a sequence of MRI images. In another example, the input images 120 may correspond to a sequence of dynamic cardiac CT images. As used herein, the number, n, may include a target image indicated by image index, t, with corresponding image data 306-$t$, one or more subsequent images indicated by image index t+i, (i=1, 2, . . . ), with corresponding image data 306-($t$+i), and one or more prior images indicated by image index t-i, (i=1, 2, . . . ), with corresponding image data 306-($t$–i).

Temporal stage 302 includes a forward ConvLSTM subsystem 309 and a backward ConvLSTM subsystem 311. Forward ConvLSTM subsystem 309 includes a plurality of forward ConvLSTM networks 310-(t−1), 310−t, 310−(t+1), and backward ConvLSTM subsystem 311 includes a plurality of backward ConvLSTM networks 312-(*t*−1), 312-*t*, 312-(*t*+1). Temporal stage 302 thus illustrates three forward ConvLSTM networks, and three backward ConvLSTM networks. In one example, temporal stage 302 may include three forward ConvLSTM networks, and three backward ConvLSTM networks. Thus, in this example, each ConvLSTM subsystem 309, 311 may be configured to process the target image 306-*t*, one prior image 306-(*t*−1) and one subsequent image 306-(*t*+1). In another example, the temporal stage may include seven forward ConvLSTM networks, and seven backward ConvLSTM networks. Thus, in this example, each ConvLSTM subsystem 309, 311 may be configured to process the target image 306-*t*, three prior images 306-(*t*−i), and three subsequent images 306-(*t*+i), i=1, 2, 3. However, this disclosure is not limited in this regard, and other numbers of forward and backward ConvLSTM networks may be included in temporal stage 302, within the scope of the present disclosure.

Each forward ConvLSTM network, e.g., forward ConvLSTM network 310-*t*, includes a plurality of ConvLSTM and rectified linear unit (ConvLSTM/ReLU) blocks 314-1, 314-2, 314-3. As used herein, ReLU, i.e., rectified linear unit, corresponds to an activation function. Similarly, each backward ConvLSTM network, e.g., backward ConvLSTM network 312-*t*, includes a plurality of ConvLSTM/ReLU blocks 316-1, 316-2, 316-3. Each forward ConvLSTM/ReLU block 314-1, 314-2, 314-3, of forward ConvLSTM network 310-*t*, is configured to provide a respective forward ConvLSTM/ReLU block output 315-1, 315-2, 315-3, to encoder circuitry 330. Similarly, each backward ConvLSTM/ReLU block 316-1, 316-2, 316-3, of backward ConvLSTM network 312-*t*, is configured to provide a respective backward ConvLSTM/ReLU block output 317-1, 317-2, 317-3, to encoder circuitry 330. It may be appreciated that each forward ConvLSTM/ReLU block output 315-1, 315-2, 315-3, and each backward ConvLSTM/ReLU block output 317-1, 317-2, 317-3 corresponds to a feature pass, as described herein.

Each ConvLSTM/ReLU block may be expressed as:

$$i_t = \sigma(W_{xi}*X_t + W_{hi}*H_{t-1} + W_{ci} \circ C_{t-1} + b_i)$$

$$f_t = \sigma(W_{xf}*X_t + W_{hf}*H_{t-1} + W_{cf} \circ C_{t-1} + b_f)$$

$$C_t = f_t \circ C_{t-1} + i_t \circ \tan h(W_{xc}* X_t + W_{hc}* H_{t-1} + b_c)$$

$$o_t = \sigma(W_{xo}*X_t + W_{ho}*H_{t-1} + W_{co} \circ C_{t-1} + b_o)$$

$$H_t = o_t \circ \tan h(C_t)$$

where * denotes a two-dimensional (2D) convolution, ○ stands for a Hadamard product, $i_t$, $f_t$, $C_t$, $o_t$, and $H_t$ are three-dimensional (3D) tensors representing input gate, forget gate, cell gate, output gate, and hidden state, respectively. In one nonlimiting example the stride and padding steps may be set to 1. However, this disclosure is not limited in this regard. In another nonlimiting example, a number of hidden state channels in each ConvLSTM/ReLU block may be 32, 64, 128. However, this disclosure is not limited in this regard.

In operation, each forward ConvLSTM network and each backward ConvLSTM network are configured to extract forward and backward temporal features. The ConvLSTM networks are configured to combine traditional LSTM with spatial convolution so that spatial and temporal information are accounted for synergistically. In one nonlimiting example, a size of each convolution kernel is 3×3, configured to extract local spatial features. However, this disclosure is not limited in this regard.

Thus, forward ConvLSTM network 310-*t* and backward ConvLSTM network 312-*t* are configured to determine temporal features and to pass those features to encoder network 330, as described herein.

Multiscale stage 304 includes a plurality of convolutional neural networks (CNN) 320-1, . . . , 320-4, and a concatenation block 322. A first CNN 320-1, a second CNN 320-2, and a third CNN 320-3 are coupled in parallel, each CNN 320-1, 320-2, 320-3 is configured to receive the input image 306-*t*, and to provide a respective CNN output to the concatenation block 322. A fourth CNN 320-4 is configured to receive a concatenation output from the concatenation block 322 and to provide multiscale stage output 321 to encoder circuitry 330.

In one nonlimiting example, a first CNN 320-1 may be configured with a 3×3 convolutional kernel, a second CNN 320-2 may be configured with a 5×5 convolutional kernel, a third CNN 320-3 may be configured with a 7×7 convolutional kernel, and the fourth CNN 320-4 may be configured with a 1×1 convolutional kernel. However, this disclosure is not limited in this regard. It may be appreciated that the range of convolutional kernels may facilitate extraction of spatial features, both locally and globally.

Thus, encoder circuitry 330 is configured to receive a plurality of temporal features from temporal stage 302, e.g., forward ConvLSTM network 310-*t* and backward ConvLSTM network 312-*t*. The encoder circuitry 330 may be further configured to receive a multiscale stage output from multiscale stage 304, e.g., the fourth CNN 320-4.

Encoder circuitry 330 is one example of encoder circuitry 234 of synthesis NN 226 of FIG. 2. Encoder circuitry 330 is configured to receive as input multiscale stage output 321 from multiscale stage 304, and to provide an encoder circuitry output 337 to the decoder circuitry 350. Multiscale stage output 321 may thus correspond to multiscale stage output 233 of FIG. 2.

Encoder circuitry 330 includes a plurality of concatenation blocks 332-1, 332-2, 332-3, a plurality of convolution/ReLU blocks 334-1, 334-2, 334-3, and a plurality of multiscale convolutional blocks 336-1, 336-2, 336-3. Each of the convolution/ReLU blocks 334-1, 334-2, 334-3 thus includes a respective convolution layer and a respective ReLU layer.

A first concatenation block 332-1 is configured to receive multiscale stage output 321 from multiscale stage 304, and a last multiscale convolutional block 336-3 is configured to provide an encoder circuitry output 337 to decoder circuitry 350. The pluralities of blocks are coupled in series, thus, a first concatenation block 332-1 is coupled to a first convolution/ReLU block 334-1 and the first convolution/ReLU block 334-1 is coupled to a first multiscale convolution of block 336-1. This sequence of three blocks is repeated between input 321 and output 337.

Each concatenation block 332-1, 332-2, 332-3 is configured to receive a respective forward ConvLSTM/ReLU block output 315-1, 315-2, 315-3, and a respective backward ConvLSTM/ReLU block output 317-1, 317-2, 317-3, from temporal stage 302. Each concatenation block 332-1, 332-2, 332-3 is configured to concatenate the received respective forward ConvLSTM/ReLU block output, and respective backward ConvLSTM/ReLU block output. Thus, concatenation block 332-1 may be configured to concatenate forward ConvLSTM/ReLU block output 315-1, and backward ConvLSTM/ReLU block output 317-1. Each convolution/ReLU block 334-1, 334-2, 334-3 is configured to provide a respective output 335-1, 335-2, 335-3 to decoder circuitry 350.

In operation, in the embodiments where encoder circuitry 330 includes multi-scale stage 304, encoder circuitry 330, e.g., multiscale stage circuitry 304, is configured to receive input image data and, in the embodiments where multistage circuitry 304 is coupled to encoder circuitry 330, encoder circuitry 330 is configured to receive a scaled output from multistage scale circuitry 304. Multiscale stage circuitry 304 and multiscale convolutional blocks 336-1, 336-2, 336-3 are configured to extract spatial features. In one nonlimiting example, multiscale convolutional blocks 336-1, 336-2, 336-3 may each include three CNNs positioned in parallel and configured with a 3×3 convolutional kernel, a 5×5 convolutional kernel, a 7×7 convolutional kernel, followed by a fourth CNN having a 1×1 convolutional kernel. However, this disclosure is not limited in this regard. It may be appreciated that the range of convolutional kernels may facilitate extraction of spatial features, both locally and globally.

The outputs from forward ConvLSTM network 310-$t$ and backward ConvLSTM network 312-$t$, i.e., features of each image (e.g., frame) extracted from forward ConvLSTM network 310-$t$ and backward ConvLSTM network 312-$t$ may be added into encoder 330, and concatenated with corresponding features at concatenation blocks 332-1, 332-2, and 332-3. It may be appreciated that each concatenation block follows a respective multiscale convolutional block. Such a feature combination is configured to facilitate utilization and encoding by the encoder 330 of both spatial features and temporal features extracted by the forward ConvLSTM and backward ConvLSTM networks of FIG. 3A.

In one nonlimiting example, the convolution blocks of the encoder 330 may use a stride of 1 and a padding of 1. However, this disclosure is not limited in this regard.

Decoder circuitry 350 is one example of decoder circuitry 236 of synthesis NN of FIG. 2. Decoder circuitry 350 is configured to receive, as input, encoder circuitry output 337 from encoder circuitry 330, and to provide as decoder circuitry output, output image data 122. Decoder circuitry 350 includes a plurality of deconvolution and ReLU (deconvolution/ReLU) blocks 352-1, . . . , 352-7, and a plurality of concatenation blocks 354-1, 354-2, 354-3. Each deconvolution/ReLU block includes a deconvolution layer and a ReLU layer.

A first deconvolution/ReLU block 352-1 is configured to receive encoder circuitry output 337 from encoder circuitry 330, and a last deconvolution/ReLU block 352-7 is configured to provide, as output, output image data 122. The plurality of blocks are coupled in series, thus, the first deconvolution/ReLU block 352-1 is coupled to a first concatenation block 354-1, the first concatenation block 354-1 is coupled to a second deconvolution/ReLU block 352-2, and the second deconvolution/ReLU block 352-2 is coupled to a third deconvolution and ReLU block 352-3. The sequence of concatenation block followed by a sequence of two deconvolution/ReLU blocks is repeated twice more in example decoder circuitry 350. In other words, the first deconvolution/ReLU block 352-1 is followed by a first sequence of blocks, including blocks 354-1, 352-2, and 352-3. The first sequence of blocks is then followed by a second sequence of blocks including blocks 354-2, 352-4, and 352-5. The second sequence of blocks and then followed by a third sequence of blocks including blocks 354-3, 352-6, and 352-7.

Each concatenation block 354-1, 354-2, 354-3, is configured to receive a respective/ReLU block output, 335-3, 335-2, 335-1, from encoder circuitry 330. It may be appreciated that the couplings between a respective convolution/ReLU block of an encoder 330 and a respective concatenation block of decoder 350 may correspond to a skip connection. It may be appreciated that coupling between concatenation blocks of decoder circuitry 350 and outputs of respective convolution/ReLU blocks of encoder 330 may be in reverse order, as described herein. Thus, encoder circuitry convolution/ReLU block output 335-1 may be coupled to decoder circuitry concatenation block 354-3, encoder circuitry convolution/ReLU block output 335-2 may be coupled to decoder circuitry concatenation block 354-2, and encoder circuitry convolution/ReLU block output 335-3 may be coupled to decoder circuitry concatenation block 354-1.

Thus, decoder 350 includes seven deconvolution/ReLU blocks and is configured to receive features extracted by selected convolution blocks of multiscale stage 304 and/or encoder 330. The decoder 350 is thus configured to gradually decode a plurality of features and to then provide image output data 122, corresponding to a sequence of deblurred images.

In one nonlimiting example, the seven deconvolution/ReLU blocks may use a kernel size of 3, a stride of 1, and a padding of 1. However, this disclosure is not limited in this regard.

In one nonlimiting example, during training in the WGAN framework, the discriminator, e.g., discriminator network 109, may include six convolution layers and two fully connected layers. Each convolution layer may include 3×3 convolution kernels, with a stride of 1 and a padding of 1. Continuing with this example, the numbers of convolution kernels in these layers were 64, 64, 128, 128, 256, and 256. The discriminator may further include respective ReLU activation functions after each convolution layer, followed by a max pooling layer with a size of 2×2 and a stride of 2, after a second and a fourth convolution layer. A first fully convolutional layer may include 1024 neurons and a final convolution layer may include one neuron. However, this disclosure is not limited in this regard.

Further during training in the WGAN framework, a perceptual loss was included as part of an objective function (based on a VGG16 model) for the generator, e.g., deep neural network 200. An $l_2$ norm of features from the second, fourth, seventh, and tenth convolutional layers were used for loss calculation. The objective function corresponded to a summation of perceptual losses over all frames in the sequence, where a length of the sequence, L, corresponds to a number of images in an input data image sequence. An overall objective function for the generator included a combination of the perceptual loss and an adversarial loss.

It may be appreciated that using the perceptual loss may be beneficial. The perceptual loss is configured to determine a plurality of distances between estimated and ground truth images in various feature levels, thus incorporating shallow, intermediate and deep features and may be configured to regularize the output of the network to provide relatively high fidelity. Additionally or alternatively, the perceptual loss may overcome, "over smoothing". An objective function for the discriminator may then include the Wasserstein distance and a gradient penalty. Thus, a deep neural network, according to the present disclosure, may be trained in a WGAN framework.

Thus, a deep learning neural network, e.g., a recurrent neural network, may be configured for cardiac cine MRI motion artifact reduction. In one nonlimiting example, a 3D dataset (i.e., 2D spatial data and 1D temporal data) may be input to a deep neural network, facilitating extracting both spatial and temporal features. Incorporating ConvLSTM branches and including temporal information in the deep neural network may yield image quality better than image quality that is based only on spatial information. When compared to the model with a single directional ConvL-STM, the network using bidirectional ConvLSTM branches may handle temporal information in both forward and backward directions to extract more temporal features. As a result, the bi-directional ConvLSTM mechanism may provide relatively better results. When comparing with the results obtained via single-scale processing, adding multi-scale structures improves the performance of the proposed network. Different from the network that only uses 3×3 convolution kernels, a multi-scale processing workflow, according to the present disclosure, is configured to use 3×3, 5×5, and 7×7 convolution kernels, and is capable of extracting spatial features of multiple scales, from a very local scale to a larger extent. These multilevel spatial features may facilitate refining reconstruction results. The combination of bi-directional ConvLSTM branches and multi-scale structures may thus provide a relatively better imaging performance.

A method, apparatus and/or system, according to the present disclosure, may improve cardiac MR image quality, in general. For example, the method apparatus and/or system may generate relatively clearer images with less motion artifacts and/or may improve a temporal resolution of a given image sequence by estimating missing frames. Decreasing the interference of cardiac motion during the scan may facilitate relatively more precise cardiac tissue profiles, and sequences with higher temporal resolution, leading to a relatively better presentation of cardiac tissues. These technical improvements may facilitate a relatively higher diagnostic performance for cardiovascular diseases. Additionally or alternatively, relatively high quality motion-free cines may be obtained, without ECG, indicating a simplified workflow of clinical cine cardiac MRI scanning with little pre-scan preparation. It is contemplated that a method, apparatus and/or system, according to the present disclosure, may facilitate a potential for cine cardiac MRI scan acceleration. For example, image quality may be improved based, at least in part, on k-space under-sampled MR images, and future MRI scans may be further accelerated.

Figure 4:
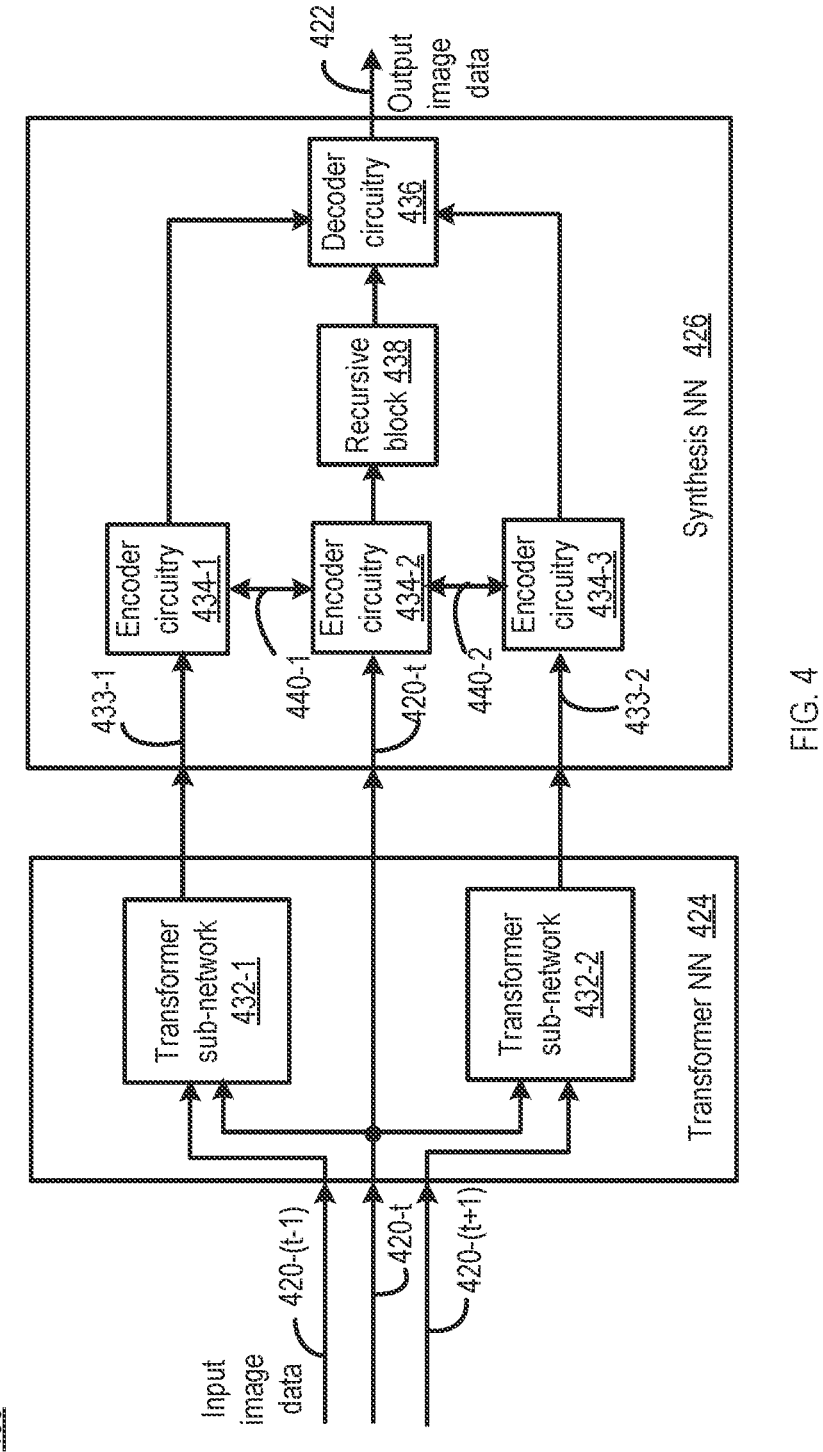
FIG. 4 illustrates a functional block diagram of another example deep neural network architecture, according to an embodiment of the present disclosure.

FIG. 4 illustrates a functional block diagram of another example deep neural network architecture 400, according to an embodiment of the present disclosure. Example deep neural network architecture 400 is one example of deep neural network 102 of FIG. 1. Deep neural network 400 includes a transformer NN 424 and a synthesis NN 426. Transformer NN 424 is configured to receive input image data 420-(t−1), 420-t, 420-(t+1), to pass target input image data 420-t to synthesis NN 426, and to provide transformer NN 424 output data 433-1, 433-2 to synthesis NN 426. Synthesis NN 426 is configured to receive the target input image data 420-t, and the transformer NN 424 output data 433-1, 433-2 and to produce output image data 422.

Transformer NN 424 includes a first transformer subnetwork 432-1, and a second transformer subnetwork 432-2.

Synthesis NN 426 includes a plurality of encoder circuitry blocks 434-1, 434-2, 434-3 and decoder circuitry 436. The first transformer subnetwork 432-1 is configured to receive a target input image 420-t, and a prior image 420-(t−1), and to provide a first transformed image 433-1 to a first encoder circuitry block 434-1. The second transformer subnetwork 432-2 is configured to receive the target input image 420-t, and a subsequent image 420-(t+1), and to provide a second transformed image 433-2 to a third encoder circuitry block 434-3. The second encoder circuitry block 434-2 is configured to receive the target image 420-t.

Each encoder circuitry block 434-1, 434-2, 434-3 includes a sequence of recursive blocks that include weight sharing 440-1, 440-2. Thus, encoder circuitry block 434-1 may share weights 440-1 with encoder circuitry block 434-2, and encoder circuitry block 434-2 may share weights 440-2 with encoder circuitry block 434-3. In one nonlimiting example, each encoder circuitry block may include five recursive blocks. Synthesis NN 426 further includes a recursive block 438 coupled between the second encoder circuitry block 434-2 and decoder circuitry 436. Thus, a path of target input image 420-t, may include a sequence of six recursive blocks, and respective paths of the prior input image 420-(t−1), and the subsequent input image 420-(t+1) may each include a sequence of five recursive blocks.

Decoder circuitry 436 is configured to receive an output from encoder circuitry blocks 434-1, 434-3, and from encoder circuitry block 434-2 via recursive block 438. In one nonlimiting example, the decoder circuitry 436 may include six recursive blocks. Decoder circuitry 436 is further configured to receive a respective two skip connections from each encoder circuitry block 434-1, and 434-3, and three skip connections from encoder circuitry block 434-2. Decoder circuitry 436 is configured to provide, as output, output image data 422.

In operation, after training, the first transformer subnetwork 432-1 is configured to generate a first transformed image 433-1 based, at least in part, on the target input image 420-t, and the prior input image 420-(t−1). The second transformer subnetwork 432-2 is configured to generate a second transformed image 433-2 based, at least in part, on the target input image 420-t, and the subsequent input image 420-(t+1). Thus, transformer NN 424 may be configured to mitigate temporal effects in input image data. Synthesis NN 426 may then be configured to mitigate spatial effects based, at least in part, on the received transformed image 433-1, 433-2, and based, at least in part, on the target input image 420-t.

Figure 5A:
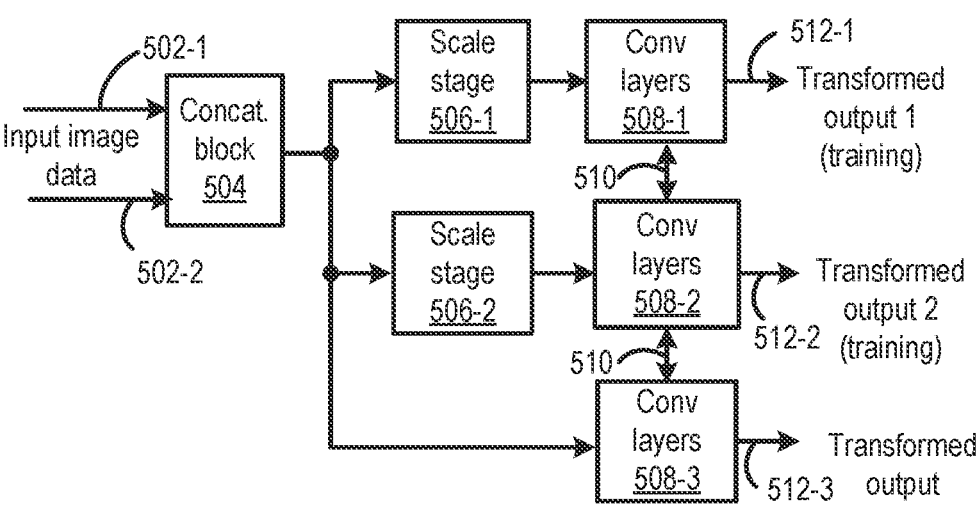
FIG. 5A illustrates a functional block diagram of an example transformer neural network architecture corresponding to a transformer subnetwork of the deep neural network of FIG. 4.

FIG. 5A illustrates a functional block diagram of an example 500 transformer NN architecture corresponding to a transformer subnetwork, e.g., transformer subnetwork 432-1, or 432-2, of the deep neural network 400 of FIG. 4. The following description of example 500 transformer NN architecture may be best understood when considered in combination with FIG. 4. Transformer NN 500 is one example transformer NN corresponding to each transformer subnetwork 432-1, 432-2 of transformer NN 424 of FIG. 4. Transformer NN 500 includes a concatenation block 504, a first scale stage 506-1, a second scale stage 506-2, and three convolutional layers blocks 508-1, 508-2, 508-3.

Concatenation block 504 is configured to receive input image data 502-1, and input image data 502-2, and to concatenate the received input image data 502-1 and 502-2. For example, for transformer subnetwork 432-1, input image data 502-1 may correspond to a prior image, e.g., prior image data 420-(t−1), and input image data 502-2 may correspond to a current (i.e., target) image, e.g., target input image data 420-*t*. Continuing with this example, for transformer subnetwork 432-2, input image data 502-1 may correspond to the current (i.e. target) image, e.g., target input image data 420-*t*, and input image data 502-2 may correspond to a subsequent image, e.g., subsequent input image data 420-(*t*+1).

An output of concatenation block 504 may be provided to a first scale stage 506-1, a second scale stage 506-2, and a third convolutional layers block 508-3. In an embodiment, a multi-scale training strategy may be configured to generate relatively more accurate transformed frames. In one nonlimiting example, the input image data, 502-1, 502-2 (e.g., frame pairs) may be down-sampled twice and four times, by scale stage 506-1 and 506-2, respectively, using averaging pooling.

An output of the first scale stage 506-1 may be provided to a first convolutional layers block 508-1, and an output of the second scale stage 506-2 may be provided to a second convolutional layers block 508-2. Each transformer subnetwork may correspond to a densely connected neural network, containing a plurality of convolutional layers. Thus, each convolutional layers block 508-1, 508-2, 508-3 may contain a plurality of convolutional layers coupled in series. In some embodiments, the plurality of convolutional layers may further include skip connections between at least some convolutional layers. In one nonlimiting example, each transformer sub-network may contain six convolutional layers, with skip connections. Thus, each convolutional layers block 508-1, 508-2, 508-3 may contain six convolutional layers. Continuing with this example, the first five convolutional layers may include 32 kernels and the final convolutional layer may include 1 kernel. However, this disclosure is not limited in this regard.

The convolutional layers blocks 508-1, 508-2, 508-3 may be configured to share weights 510. An output 512-1 of the first convolutional layers block 508-1 may correspond to a transformed output 1, used for training. Similarly, an output 512-2 of the second convolutional layers block 508-2 may correspond to a transformed output 2, used for training. A transformer subnetwork output, e.g., 433-1 or 433-2, may then correspond to a transformed output 512-3, output from the third convolutional layers block 508-3.

Figure 5B:
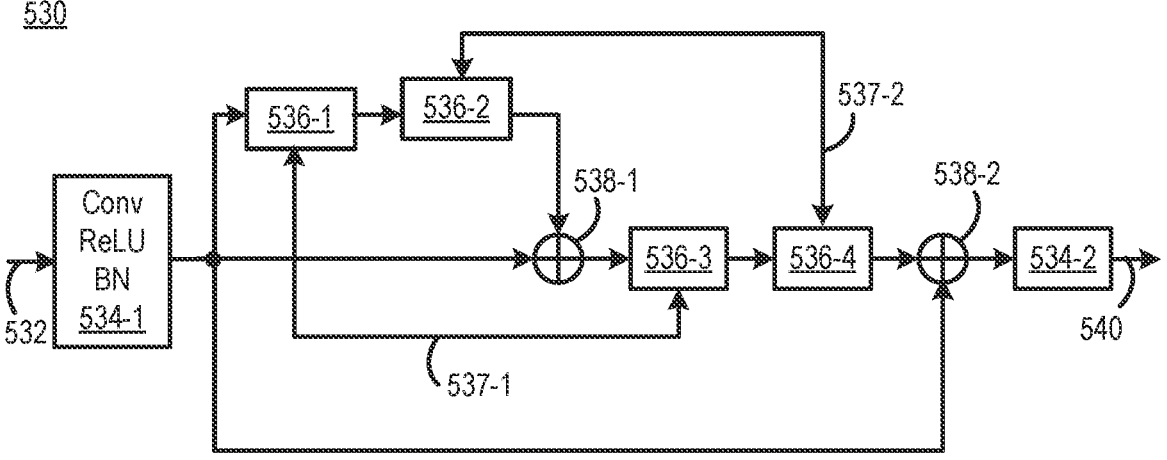
FIG. 5B illustrates a functional block diagram of an example weight-sharing circuitry included in a synthesis network of the deep neural network of FIG. 4.

FIG. 5B illustrates a functional block diagram of an example weight-sharing circuitry 530 included in a synthesis network of the deep neural network 400 of FIG. 4. The following description of example weight sharing circuitry 530 may be best understood when considered in combination with FIG. 4. Weight sharing circuitry 530 is one example of an implementation of weight sharing 440-1, 440-2. Weight sharing circuitry 530 is configured to receive input 532, and to provide as output 540. Weight sharing circuitry 530 includes a first block 534-1 and a second block 534-2 that each includes a respective convolution layer, ReLU, and batch normalization layer. Weight sharing circuitry 530 further includes a plurality of blocks 536-1, . . . , 536-4 that each includes a respective convolution layer and a respective ReLU (i.e., conv/ReLU block), two summing junctions 538-1, 538-2, and two weight sharing pathways 537-1, 537-2. A first weight sharing pathway 537-1 is configured to share weights between a first conv/ReLU block 536-1 and a third conv/ReLU block 536-3. A second weight sharing pathway 537-2 is configured to share weights between a second conv/ReLU block 536-2 and a fourth conv/ReLU block 536-4.

Turning again to FIG. 4 and FIG. 5A, transformer NN 424, and transformer subnetworks, 432-1, 432-2, and example transformer subnetwork 500 may be trained using simulated or actual training data. Training data may include training input data and corresponding training output data. The training input data corresponds to input image data that may be low resolution and/or blurry from dynamic imaging and/or motion artifacts, as described herein. The corresponding training output data may then correspond to ground truth data (i.e., image frames without motion artifacts and with sufficient (e.g., high) resolution). In one nonlimiting example, an objective function used for training transformer subnetwork(s) may be written as:

$$\mathcal{L}_{T_i} = \sum_{k=1}^{3} \mathbb{E}_{I_{input_k}, I_{GT}} |\phi(I_{input_k}) - \phi(I_{GT})|_2^2$$

where input corresponds to low resolution or low dose input image data, GT corresponds to ground truth, i.e., training target output data, $T_i$ corresponds to each transformer sub-network, i=1, 2, $\phi$ corresponds to perceptual loss, and k corresponds to an index of multi-scale branches, k=1, 2, 3. It may be appreciated that the objective function, $\mathcal{L}_{T_i}$, corresponds to a perceptual loss.

Synthesis NN 426 includes encoder circuitry blocks 434-1, 434-2, 434-3, recursive block 438 and decoder circuitry block 436, as described herein. It may be appreciated that a structure of Synthesis NN 426 may correspond to a modified autoencoder-decoder network. In one nonlimiting example, each encoder circuitry block 434-1, 434-2, 434-3 includes five recursive blocks and is configured to extract features from each input frame. In one nonlimiting example, decoder circuitry 436 includes six recursive blocks. Decoder circuitry 436 is configured to combine features from three input images and reconstruct an output image. In each recursive block, selected pairs of convolutional layers may share weights, as described herein. In one nonlimiting example, a number of kernels in each recursive block in each encoder circuitry block is 32, 32, 64, 64, 128, 128 (including recursive block 438). In another nonlimiting example, a number of kernels in each recursive block in the decoder circuitry is 128, 128, 64, 64, 32, 32. The objective function of the synthesis NN 426 may then be written as:

$$\mathcal{L}_S = \mathbb{E}_{I_{input_k}, I_{GT}} |\phi(I_{input_k}) - \phi(I_{GT})|_2^2$$

An overall objective function for the deep neural network 400 may then be written as:

$$\mathcal{L} = \alpha(\mathcal{L}_{T_1} + \mathcal{L}_{T_2}) + \beta \mathcal{L}_S$$

where $\alpha$ and $\beta$ are the weight for each term, respectively.

Thus, deep neural network 400 may be trained, using either MRI or dynamic CT input image data, as described herein. The trained network may then be used to mitigate temporal and/or spatial dynamic imaging artifacts, as described herein.

Turning again to FIG. 4, in one embodiment, input image data 420-(*t*−1), 420-*t*, 420-(*t*+1) may correspond to three consecutive low-dose CT frames in a same slice. In another embodiment, input image data 420-(*t*−1), 420-*t*, 420-(*t*+1) may correspond to three consecutive LR (low resolution) MRI frames in a same slice. Transformer NN 424 may then be configured to transform a respective adjacent frame 420-(*t*−1), or 420-(*t*+1) into the target frame 420-*t* to produce two transformed frames 433-1, 433-2, and the synthesis NN 426 is configured to combine the two transformed frames (i.e., intermediate frames) and the target frame into a super-resolution target frame.

In some embodiments, deep neural network 400 may be configured to improve the quality of fast-scan MRI images. In one nonlimiting example, a deep neural network 400 may be configured to achieve dynamic cardiac MRI super-resolution. The deep neural network 400 may be configured to process a relatively low-resolution and motion blurred cardiac MRI image configured to convert low-resolution images from, for example, a fast MRI scan into super-resolution results comparable with high-quality MRI images from long-time high-field scan. Additionally or alternatively, the deep neural network 400 may be configured to correct the input image data for motion artifacts.

Thus, deep neural network 400 may be configured to enable dynamic super-resolution to make use of temporal information contained in a series of images and generate results that are superior to static super-resolution results. The method is configured to reduce cardiac MRI scan time and correct motion artifacts to improve image quality. For example, deep neural network 400 may be configured to convert blurred MRI images obtained with fast scan into high-quality images that may be comparable with full scan images.

In some embodiments, deep neural network 400 may be configured to achieve dynamic cardiac MRI super-resolution. For example, deep neural network 400 may be configured to reduce heart motion artifacts and improve image quality of a low-speed ECG (electrocardiogram)-free CT scan. It is contemplated that example deep neural network 400 and a corresponding deep learning method may be configured to simultaneously implement heart motion artifact reduction and low-dose CT denoising.

In one nonlimiting example, a deep neural network 400 may be configured to utilize a deep learning method to achieve dynamic electrocardiogram-free cardiac CT motion artifact reduction and dose reduction. In one nonlimiting example, the deep neural network 400 may be configured to process a relatively low-dose and motion blurred cardiac CT images, and to convert low-dose CT images from a low-speed electrocardiogram-free CT scan into results comparable with high-quality CT images from high-speed electrocardiogram-gated scan. Additionally or alternatively, deep neural network 400 may be configured to correct motion artifacts.

Thus, deep neural network 400 may be configured to enable dynamic cardiac motion artifact reduction and dose reduction that make use of temporal information contained in a series of electrocardiogram-free CT images and generate relatively high quality results that have fewer motion artifacts and low-dose artifacts.

After training, deep learning system 100, e.g., deep learning module 106, may be configured to receive input data 105 that includes input image data, e.g., input image data 120, for which a corresponding output image data 122 is to be provided. The input image data 120 may include a number, n, of sequential input images. In one example, the input images may correspond to dynamic MRI images. In another example, the input images may correspond to motion CT images. The selected input image data 120 may then be provided to deep neural network 102. Deep neural network 102 may then produce corresponding output image data, e.g., output image data 122, based, at least in part, on the received input image data 120, and using the trained deep neural network 102. The output image data may then correspond to a motion corrected image, related to the received input image data.

Figure 6:
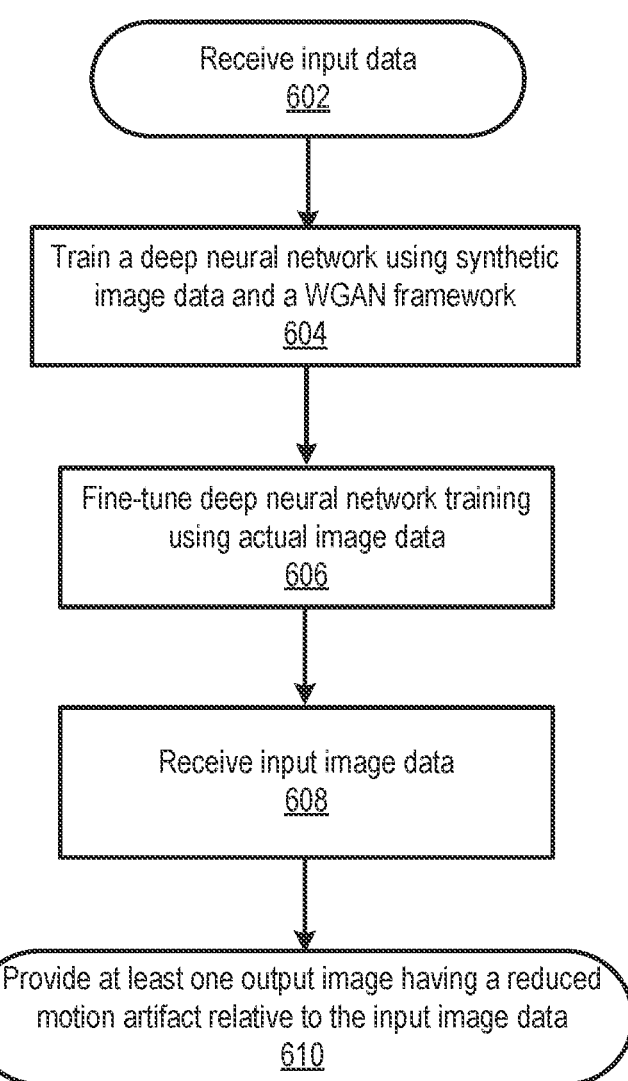
FIG. 6 is a flowchart of operations for dynamic imaging and motion artifact reduction, according to various embodiments of the present disclosure.

FIG. 6 is a flowchart 600 of operations for dynamic imaging and motion artifact reduction, according to various embodiments of the present disclosure. In particular, the flowchart 600 illustrates training and using a deep neural network for dynamic imaging and motion artifact reduction. The operations may be performed, for example, by the deep learning system 100 (e.g., deep neural network 102, deep learning module 106, and/or training module 108) of FIG. 1.

Operations of this embodiment may begin with receiving input data at operation 602. Operation 604 includes training a deep neural network using synthetic image data and a Wasserstein generative adversarial network (WGAN) framework. Operation 606 includes fine-tuning deep neural network training using actual image data. Operation 608 includes receiving input image data. At least one output image having a reduced motion artifact relative to the input image data may be provided at operation 610.

Thus, a deep neural network may be trained and may then be configured to provide motion artifact reduction.

As used in any embodiment herein, the terms "logic" and/or "module" may refer to an app, software, firmware and/or circuitry configured to perform any of the aforementioned operations. Software may be embodied as a software package, code, instructions, instruction sets and/or data recorded on non-transitory computer readable storage medium. Firmware may be embodied as code, instructions or instruction sets and/or data that are hard-coded (e.g., nonvolatile) in memory devices.

"Circuitry", as used in any embodiment herein, may include, for example, singly or in any combination, hard-wired circuitry, programmable circuitry such as computer processors comprising one or more individual instruction processing cores, state machine circuitry, and/or firmware that stores instructions executed by programmable circuitry. The logic and/or module may, collectively or individually, be embodied as circuitry that forms part of a larger system, for example, an integrated circuit (IC), an application-specific integrated circuit (ASIC), a system on-chip (SoC), desktop computers, laptop computers, tablet computers, servers, smart phones, etc.

Memory 112 may include one or more of the following types of memory: semiconductor firmware memory, programmable memory, non-volatile memory, read only memory, electrically programmable memory, random access memory, flash memory, magnetic disk memory, and/or optical disk memory. Either additionally or alternatively system memory may include other and/or later-developed types of computer-readable memory.

Embodiments of the operations described herein may be implemented in a computer-readable storage device having stored thereon instructions that when executed by one or more processors perform the methods. The processor may include, for example, a processing unit and/or programmable circuitry. The storage device may include a machine readable storage device including any type of tangible, non-transitory storage device, for example, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of storage devices suitable for storing electronic instructions.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

What is claimed is:

1. A deep neural network for motion artifact reduction in medical imaging data, the deep neural network comprising:
   a transformer neural network configured to receive input image data comprising a target image, a prior image, and a subsequent image, the transformer neural network configured to mitigate a temporal aspect of at least one motion artifact in the input image data, and to provide a transformer output related to the input data; and
   a synthesis neural network configured to receive the transformer output from the transformer neural network, and to provide at least one output image having a reduced motion artifact relative to the input image data;
   wherein the deep neural network was trained using training input data comprising input data comprising input image data that is at least one of low resolution and blurry from least one of dynamic imaging and motion artifacts and using training output data comprising ground truth image data; and
   wherein the transformer neural network comprises a temporal stage and a multiscale stage, wherein the temporal stage comprises a forward convolutional long short-term memory (ConvLSTM) network and a backward ConvLSTM network, each forward and backward ConvLSTM network comprising a plurality of ConvL-STM and rectified linear unit (ConvLSTMReLU) blocks in which each rectified linear unit corresponds to an activation function, in which each block produces a block output, and the multiscale stage comprises a plurality of convolutional neural networks (CNN) disposed in parallel with one another, each CNN being configured to receive the input image and coupled to a concatenation block, wherein a resulting CNN output is received by the concatenation block, the multiscale stage further comprising a separate CNN configured to receive a concatenation output from the concatenation block and in which the synthesis neural network comprises an encoder circuitry and a decoder circuitry in which the encoder circuitry is configured to receive a plurality of temporal features from the block outputs of the temporal stage and a multiscale stage output which is the concatenation output from the multiscale stage of the transformer neural network as the transformer output.

2. The deep neural network of claim 1, wherein the transformer neural network and the synthesis neural network are trained in a Wasserstein generative adversarial network (WGAN) framework.

3. The deep neural network of claim 1, wherein the input image data is selected from the group comprising magnetic resonance imaging (MRI) image data and computed tomography (CT) image data.

4. The deep neural network of claim 1, wherein the transformer neural network and the synthesis neural network are configured to extract both temporal features and spatial features.

5. The deep neural network of claim 1, wherein the transformer neural network or the synthesis neural network is trained using synthetic data.

6. The deep neural network of claim 5, wherein the training is fine-tuned using actual data.

7. A deep learning system for motion artifact reduction in medical imaging data, the deep learning system comprising:
   a computing device comprising a processor, a memory, an input/output circuitry, and a data store;
   a deep learning module configured to receive input data; and
   a deep neural network comprising a transformer neural network configured to receive input image data comprising a target image, a prior image, and a subsequent image, the transformer neural network configured to mitigate a temporal aspect of at least one motion artifact in the input image data, and to provide a transformer output related to the input data, and a synthesis neural network configured to receive the transformer output, and to provide at least one output image having a reduced motion artifact relative to the input image data;
   wherein the deep neural network was trained using training input data comprising input image data that is at least one of low resolution and blurry from at least one of dynamic imaging and motion artifacts and using training output data comprising ground truth image data; and
   wherein the transformer neural network comprises a temporal stage and a multiscale stage, in which the temporal stage comprises a forward convolutional long short-term memory (ConvLSTM) network and a backward ConvLSTM network, each forward and backward ConvLSTM network comprising a plurality of ConvL-STM and rectified linear unit (ConvLSTMReLU) blocks in which each rectified linear unit corresponds to an activation function and each block produces a block output, and the multiscale stage comprises a plurality of convolutional neural networks disposed in parallel and coupled to a concatenation block, each CNN being configured to receive the input image wherein a resulting CNN output is received by the concatenation block, and a separate CNN that is configured to receive a concatenation output from the concatenation block and in which the synthesis neural network comprises an encoder circuitry and a decoder circuitry, wherein the encoder circuitry is configured to receive a plurality of temporal features from the block outputs of the temporal stage and a multiscale stage output which is the concatenation output from the multiscale stage as the transformer output.

8. The deep learning system of claim 7, wherein the transformer neural network and the synthesis neural network are trained in a Wasserstein generative adversarial network (WGAN) framework.

9. The deep learning system of claim 7, wherein the input image data is selected from the group comprising magnetic resonance imaging (MRI) image data and computed tomography (CT) image data.

10. The deep learning system of claim 7, wherein the transformer neural network and the synthesis neural network are configured to extract both temporal features and spatial features.

11. The deep learning system of claim 7, wherein the transformer neural network or the synthesis neural network is trained using synthetic data.

12. The deep learning system of claim 11, wherein the training is fine-tuned using actual data.

* * * * *